Feb. 24, 1970 S. S. DAMRON ET AL 3,497,634

WIDEBAND INSTRUMENTATION ROTARY HEAD SYSTEM USING REDUNDANT RECORDING AND REPRODUCING

Filed March 17, 1967 3 Sheets-Sheet 1

INVENTORS.
SIDNEY S. DAMRON.
BURNET
BY

Feb. 24, 1970 S. S. DAMRON ET AL 3,497,634
WIDEBAND INSTRUMENTATION ROTARY HEAD SYSTEM USING REDUNDANT RECORDING AND REPRODUCING
Filed March 17, 1967 3 Sheets-Sheet 2

INVENTORS.
SIDNEY S. DAMRON,
BURNET M. POOLE

BY Robert H. Clay
ATTORNEY

INVENTORS.
SIDNEY S. DAMRON,
BURNET M. POOLE
BY
Robert G. Clay
ATTORNEY

United States Patent Office 3,497,634
Patented Feb. 24, 1970

3,497,634

WIDEBAND INSTRUMENTATION ROTARY HEAD SYSTEM USING REDUNDANT RECORDING AND REPRODUCING

Sidney S. Damron and Burnet M. Poole, Los Altos, Calif., assignors to Ampex Corporation, Redwood City, Calif., a corporation of California Filed Mar. 17, 1967, Ser. No. 623,864
Int. Cl. G11b *5/04*
U.S. Cl. 179—100.2 10 Claims

ABSTRACT OF THE DISCLOSURE

A magnetic tape digital or other instrumentation data processing system in which tape dropout errors are minimized by redundant recording of the same data in FM form on spaced dual tracks of the tape. In playback, the same FM data is simultaneously reproduced from the dual tracks, added together and limited. Loss of the limited signal occurs with very low probability only when tape dropouts exist at respective points of the dual tracks being simultaneously reproduced. The limited signal is demodulated to reconstitute the original data with negligible error.

Background of the invention

Errors in the recording and reproducing of instrumentation signals with systems of the type disclosed in application Ser. No. 137,368 of Kietz et al., now United States Patent No. 3,304,377, assigned to the assignee of the present invention, result almost entirely from tape dropouts. In this regard such a system employs a timing pilot signal for both electro-mechanical and electronic time base correction, and slow switching to combine the time base corrected reproduced signals coming sequentially from the rotating heads to provide a continuous signal that is virtually free of time base errors and errors resulting from switching transients. Any remaining errors of significance are therefore due to tape dropouts, i.e., magnetic and/or mechanical imperfections in the tape. Most dropouts can be attributed to oxide voids incurred in the tape at the time of manufacture, scratches incurred either when the tape was in the manufacturing process or after receipt by the customers, and crinkling or other mishandling of the tape. Dropout errors can thus be minimized to a lower order by preselecting the tape for a minimum of oxide voids and exercising normal precautions in the handling and use of the tape. However, in certain applications it is desirable that the dropout errors by reduced to the extent that they are virtually non-existent. For example, in the processing of digital data on magnetic tape with an extremely low error rate such as 1 bit in $10^9$, the dropout errors must be held to a considerably lower order than is obtainable by preselection and careful handling of presently commercially available tape.

Summary of the invention

The present invention is directed to the attainment of an extremely low rate of error from tape dropouts in the recording and reproducing of instrumentation signals in wideband rotary head magnetic tape systems.

In the accomplishment of the foregoing, the present invention utilizes to great advantage the principle that the probability that dropouts occurring simultaneously at any two randomly chosen points on a magnetic tape is very low providing the distance between these points is large in comparison to the size of the dropouts. In this regard, the invention generally provides for the redundant recording of the same FM video signal information on dual channels of a magnetic tape. This is accomplished, for example, by simultaneously applying the FM signal to the two channels of a dual channel version of the wideband rotary head instrumentation recording and reproducing system disclosed in the previously referenced Kietz et al. copending application Ser. No. 137,368, now United States Patent No. 3,304,377. The set of heads associated with one channel are circumferentially spaced relative to the set of heads associated with the other channel such that heads of both sets are always simultaneously recording the signal. In this manner, the two sets of heads redundantly record the signal on the tape in spaced-apart adjacent tracks thereacross. The spacing between simultaneously recorded points of adjacent tracks is much larger than the size of a dropout.

In the reproduce mode, the FM carriers of the redundantly recorded signals from the two channels are added together with negligible phase error existing therebetween. Phase error between the carriers of the respective reproduced channel signals may be held to a negligible amount by, for example, time-base correction thereof with reference to a stable clock with which a pilot signal recorded with the FM channel signals is synchronous. The carriers of the respective channel signals being substantially in phase at the time of adding, the combined RF level of the summation signal is merely halved, i.e., drops 6 db, if a dropout occurs in one channel. The carrier of the summation signal is thus not lost, despite the dropout in one channel. The only time the carrier is lost is when dropouts occur simultaneously in both channels, and as previously noted the probability of such a happenstance is extremely low.

The summation signal is next limited with the amount of limiting (typically 60 db) being substantially greater than the reduction of RF level resulting from a dropout in one channel. The reduction in level due to a dropout is thus inconsequential in the limited signal except when dropouts simultaneously occur in both channels and the carrier is entirely lost. The limited signal is demodulated to produce the original information signal with an extremely low error rate due to tape dropouts.

In accordance with another extremely important feature of the invention, the general redundant recording and reproducing method outlined above may be employed with dual channels of a magnetic tape recording and reproducing system for processing digital data at high transfer rates of the type described in the copending Damron application Ser. No. 555,156, now United States Patent No. 3,483,540, assigned to the assignee of the present invention. The system of this copending application enables digital data to be processed in a magnetic tape record/reproduce system with significantly increased transfer rates and no clock errors. When the digital processing system is combined with the redundant recording and reproducing system of the present invention, digital data can be processed at extremely high transfer rates, e.g., of the order of 20 megabits per second serial pulse code modulation with an extremely low error rate, e.g., of the order of 1 bit in $10^9$.

Description of the preferred embodiments

Figure 1:
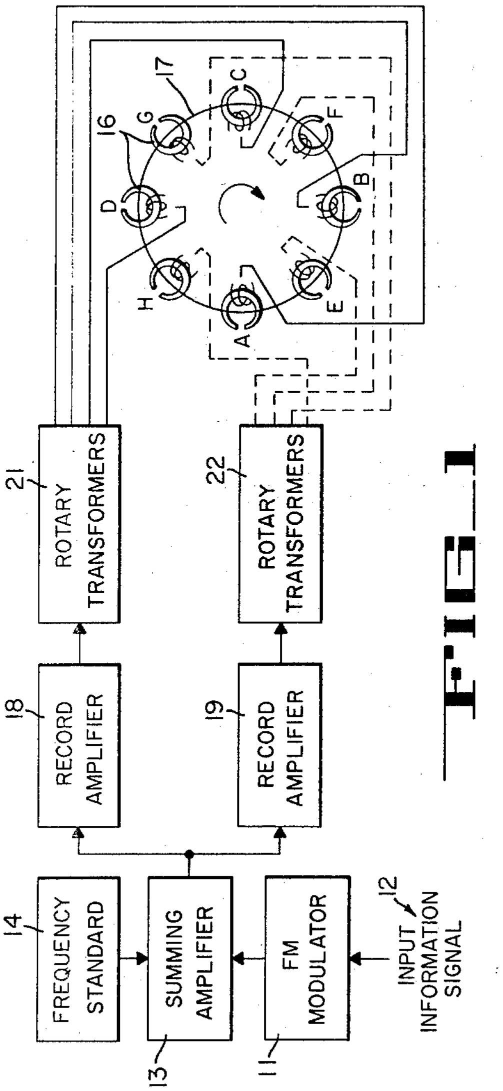
FIGURE 1 is a generalized block diagram of the record portion of a system in accordance with the present invention.

Referring now to FIGURE 1, the recording portion of an extremely low error rate recording and reproducing system in accordance with the present invention will be seen to basically include an FM modulator 11 receiving an input information signal 12, such as a wideband instrumentation signal in analog or digital form, which is to be recorded. The modulator generates an RF carrier, the frequency of which is varied in accordance with the information signal 12, and such FM information signal is, in turn, applied to one input of a summing amplifier 13, or equivalent signal combining means. A second input of the summing amplifier receives a pilot signal having a very stable frequency from a frequency standard 14. The output of the amplifier, which includes both the FM signal and pilot signal, is appropriately coupled to magnetic record heads 16 mounted at circumferentially spaced points of a rotary drum 17 which rapidly sweeps the heads in sequence transversely across a longitudinally moving tape in a well known manner.

Figure 3:
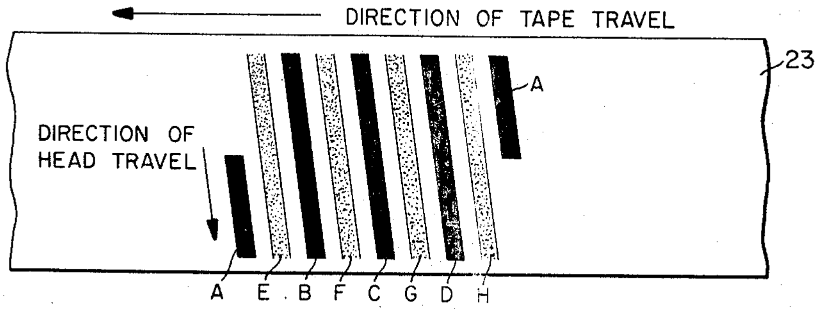
FIGURE 3 is a graphical representation of a strip of tape having dual channels of signal information redundantly recorded thereon by the record portion of the system depicted in FIGURE 1.

To the extent described to this point, the record portion of the system of the present invention outlined above is similar to that of the Kietz et al. copending application Ser. No. 137,368, now United States Patent No. 3,304,-377, in that provision is made to record a pilot signal simultaneously with an FM information signal. Both signals experience the same timing errors, and the reproducing portions of the system may be thus arranged to extract the pilot signal and develop an error signal therefrom for correcting the timing errors in the reproduced information signal. However, whereas prior art systems have employed a single channel to record the signal from each information signal source, the present system is arranged to redundantly record the signal from each source in a plurality of channels, e.g., dual channels. More particularly, the heads 16 are arranged on the drum 17 in two mutually circumferentially spaced sets, each set comprising one of the dual record channels. The heads designated as A, B, C, D are mounted on the drum at circumferentially spaced intervals of 90° and are the heads of record channel I. Record channel II includes the heads designated as E, F, G, H which are mounted at circumferentially spaced intervals of 90° and are displaced 45° from the heads of channel I. The 45° displacement between the heads of channels I and II is purely exemplary, any displacement which separates the heads of the respective channels by an amount substantially greater than the size of a dropout being suitable. The output of summing amplifier 13 is commonly coupled to the heads of channels I and II. In this regard, the amplifier output is preferably applied in common to record amplifiers 18 and 19, the outputs of which are coupled by rotary transformers 21 and 22, or equivalent means, to respectively the channel I heads ABCD and channel II heads EFGH. Both sets of heads are thus simultaneously energized with the composite output of the summing amplifier 13 which includes the FM signal and pilot signal. In a typical wideband rotary head recording and reproducing system, the guiding arrangement for the tape scanned by the rotary heads is such that the width of the tape is scanned by the drum 17 each substantially 90° of rotation thereof. Thus, the heads of each channel record an array of discontinuous tracks across the width of the tape with four tracks per channel being recorded for each drum revolution, one track by each head. Since the channel II heads are disposed between the channel I heads, the former record tracks on the tape simultaneously with tracks recorded by the latter and intermediate same. The composite of the FM signal and pilot signal is thus redundantly recorded on two sets of tracks of the tape. More particularly, with reference to FIGURE 3, assume that head A is positioned at the longitudinal center line of the tape 23 at the instant recording of the composite signal is initiated. At the same time, head E is positioned adjacent an edge of the tape. Since the signal simultaneously energizes both heads, they record the same signal information in two tracks on the tape as the head rotates substantially 45°. These tracks are designated A and E in FIGURE 3 to correspond to the heads recording same. As head A records the signal on the lower half of track A, head E records the same signal on the upper half of track E. During the next 45° of drum rotation, head E completes its track by recording the lower half thereof. At the same time, head B records the upper half of adjacent track B. In a similar manner, the signal is recorded redundantly by the successive heads of the respective channels I and II as the drum completes one revolution. The track pattern after one revolution is as illustrated in FIGURE 3, the solid tracks being traced by the channel I heads ABCD and the interposed stipled tracks being traced by the channel II heads EFGH. It is of importance to note that any given point on a channel I track is spaced from the point on a channel II track at which the same signal information is recorded by substantially half the width of the tape 23. Such distance is of course much greater than the size of a dropout, and the probability that dropouts will occur at two such corresponding points is extremely low. Moreover, by virtue of the longitudinal movement of the tape and circumferential spacing of the heads, a guard band is provided between adjacent tracks of the respective channels. Thus, the points on the tape at which the same information is recorded are also spaced longitudinalwise and the chance of a bad spot on the tape encompassing both points is reduced even further.

Figure 2:
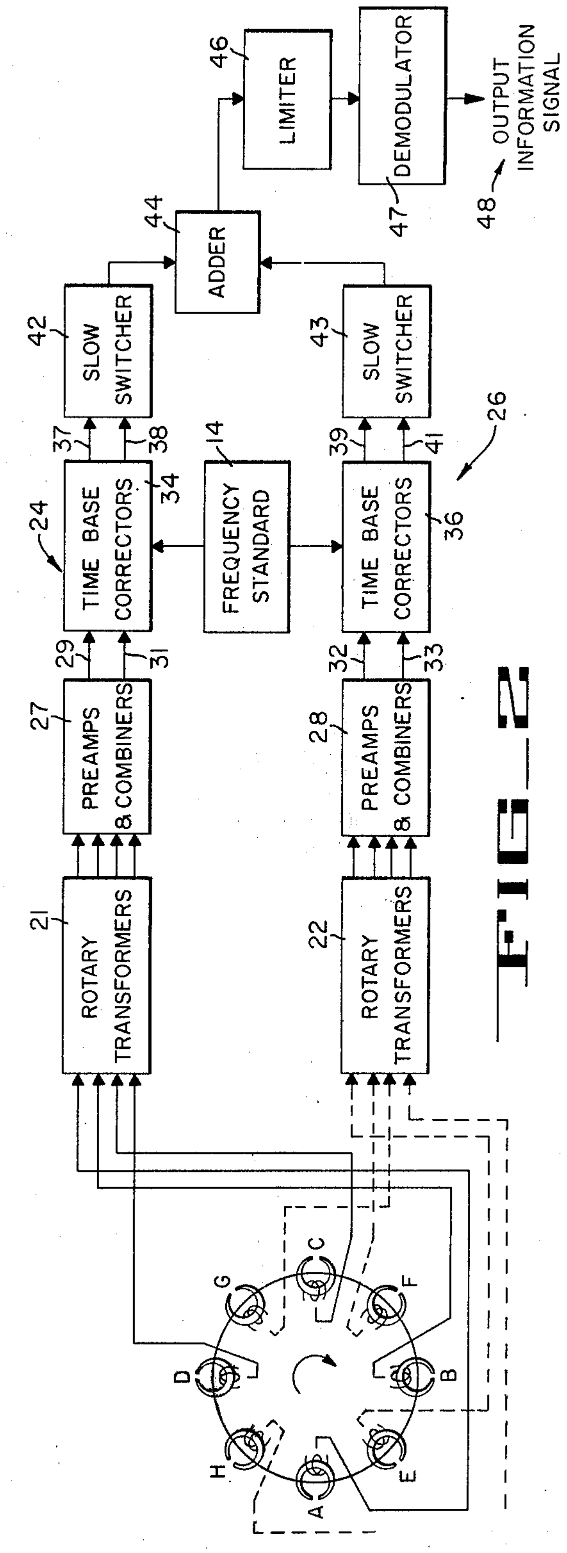
FIGURE 2 is a generalized block diagram of the reproduce portion of the system.

Considering now the basic aspects of the reproducing portion of the system of the present invention and referring to FIGURE 2, it is to be noted that the channel I heads ABCD are coupled to channel I combining and time base correcting circuitry 24, while the channel II heads EFGH are similarly coupled to channel II combining and time base correcting circuitry 26. The circuitry 24 is arranged to combine the signals sequentially reproduced by the channel I heads from the recorded discontinuous channel I tracks into a continuous time base corrected FM signal. The circuitry 26 similarly functions to produce a continuous time base corrected FM signal from the recorded channel II tracks sequentially reproduced by the channel II heads. The continuous channel I and channel II signals are time base corrected with reference to the same frequency standard, e.g., frequency standard 14 or another standard operating at the same frequency, such that these signals are substantially in phase. The channel I and II signals thus contain the same signal information at any given instant of time.

Although the channel I circuitry 24 and channel II circuitry 26 may be variously provided, arrangements of the type employed for the single reproduce channel of the system disclosed in the copending Kietz et al. application Ser. No. 137,368, now United States Patent No. 3,304,377, are preferred. In this regard the circuitry 24 preferably includes preamplifiers and combiners 27, while the circuitry 26 includes preamplifiers and combiners 28. The channel I heads ABCD and channel II heads EFGH are respectively coupled to the preamplifiers and combiners 27 and 28 as by means of the rotary transformers 21 and 22 where the record and reproduce portions of the system are provided in an integral unit. In this case suitable record/reproduce mode selector switching means (not shown) are provided to selectively couple the rotary transformers to the record amplifiers 18 and 19 or preamplifiers and combiners 27 and 28. It will be appreciated, however, that the record and reproduce portions of the system may be alternatively provided at separate units, in which case separate sets of heads, separate rotary transformers, and separate frequency standards are included in the respective portions of the system. In any event, the preamplifiers and combiners 27 channel the reproduced signals from diametrically opposed heads A and C to a first output 29, and the reproduced signals from diametrically opposed heads B and D to a second output 31. The preamplifiers and combiners 28 similarly channel the reproduced signals from diametrically opposed heads E and G to a first output 32, and the reproduced signals from diametrically opposed heads F and H to a second output 33.

The outputs 29 and 31 are applied to channel I time base correctors 34, and the outputs 32 and 33 are applied to channel II time base correctors 36. The frequency standard 14, or equivalent means, is coupled to the time base correctors 34 and 36 to provide a constant frequency reference for comparison to the pilot signal as recorded and reproduced by the channel I and channel II heads. The channel I and II time base correctors are respectively arranged to extract the pilot signal from the signals reproduced by the channel I and II heads and compare same to the constant frequency reference provided by the frequency standard to develop error signals proportional to time base errors in the reproduced signals. The error signals are employed in a well known manner to compensate the time base errors in the reproduced information signals. Time base corrected information signals reproduced by heads A and C and reproduced by heads B and D respectively appear in outputs 37 and 38 of time base correctors 34. Similarly, time base corrected information signals reproduced by heads E and G and reproduced by heads F and H respectively appear in outputs 39 and 41 of time base correctors 36. By virtue of the time base correction, successive signals from the channel I heads and from the channel II heads are terminated and initiated substantially precisely in phase. Consequently, the time base corrected information signals reproduced by heads A and C appearing at output 37, and reproduced by heads B and D appearing at output 38 may be applied to a channel I slow switcher 42 for transient free combination into a channel I continuous information signal. The time base corrected information signals reproduced by heads E and G appearing at output 39, and reproduced by heads F and H appearing at output 41 may be applied to a channel II slow switcher 43 for transient free combination into a channel II continuous information signals produced at the outputs of the slow switchers 42 and 43 are both time base corrected with respect to the common frequency standard 14, such signals are substantially in phase.

The in-phase continuous information signals at the outputs of the slow switchers 42 and 43 are applied to an adder 44 which produces a summation FM signal therefrom. The summation signal is limited by a limiter 46 which in turn applies the limited summation signal to a demodulator 47. The demodulator produces an output information signal 48 which is a replica of the input information signal 12 with extremely few errors due to tape dropouts.

Figure 4:
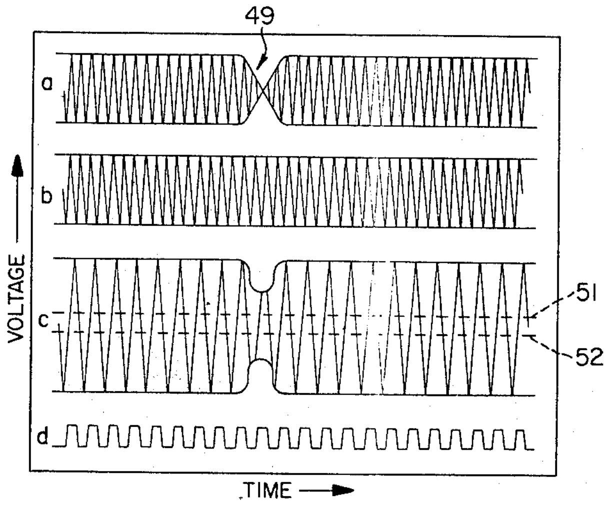
FIGURE 4 is a graphical illustration of waveforms at various points of the reproduce portion of the system depicted in FIGURE 2.

The operation of the reproduce portion of the system illustrated in FIGURE 2 in materially reducing tape dropout errors will be better understood by referring to the pertinent waveforms of FIGURE 4. As shown therein, waveforms *a* and *b* represent the channel I and II continuous FM information signals at the outputs of slow switchers 42 and 43. These signals are in phase and reproduced from the redundantly recorded spaced apart sets of channel I and II tracks appearing on the tape. Both signals contain the same information at time corresponding points thereof. The channel I signal (waveform *a*) includes a dropout as indicated at 49 whereat the FM carrier drops to zero. The channel II signal (waveform *b*) is free of dropouts in the illustrated portion of the signal. Thus when the channel I and II signals are applied to adder 44, the resulting summation signal is as represented by waveform *c*. It is to be noted that the carrier of the summation signal has a normal peak to peak amplitude of twice that of the individual channel I and II signals. In the region of the dropout 49 in the channel I signal, the peak to peak amplitude of the summation signal drops to half the normal value, i.e., the level of the RF envelope of the summation signal drops 6 db. However, the limiter 46 provides an amount of limiting far in excess of the reduction in level due to the dropout 49, e.g., the limiter has limiting levels 51 and 52. Thus, the output of the limiter (on an enlarged scale) is as represented by waveform *d*. It should be noted that there is no loss of the FM carrier despite the dropout 49, and the limiter output appears just as it would have in the absence of the dropout.

It is particularly important to note the point in the reproduce circuit at which summation of the redundant channel I and channel II signals is accomplished. More specifically, the signals are summed after time base correction and prior to limiting. The summation cannot be done prior to time base correction because phase errors would exist between the channel I and II signals and time corresponding points thereof would not contain the same signal information. The summation cannot take place after separately limiting and demodulating the two channel signals, every time a dropout occurred in one channel large noise transients would appear at the output of the demodulator for that channel which when added to the clean data coming from the other channel demodulator would result in errors.

It will be appreciated that the system of the present invention is particularly well suited to the processing of digital data by virtue of the extremely low tape dropout error rate obtainable therewith. In particular, the system may incorporate the principles set forth in the copending Damron application Ser. No. 555,156, now United States Patent No. 3,483,540, to provide processing of digital data at high transfer rates with no clock errors, and thus with extremely few overall errors. The system described hereinafter is capable of processing digital data at transfer rates of the order of 10 megabits per second with an error rate of the order of 1 bit in $10^9$ bits processed.

Figure 5:
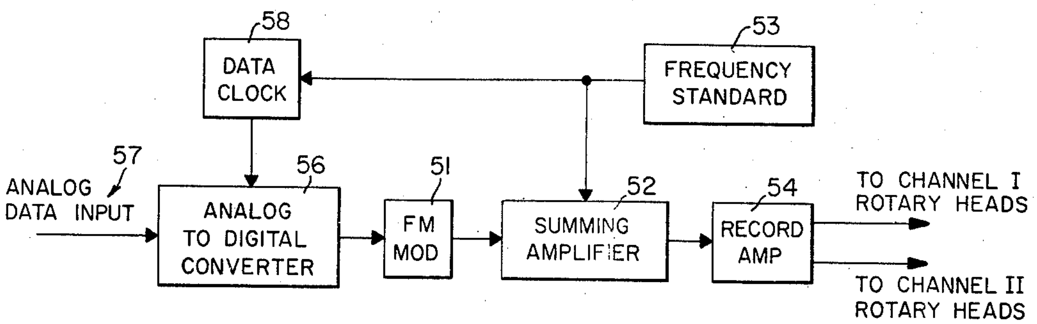
FIGURE 5 is a block diagram of the record portion of an extremely low error rate magnetic tape digital data processing system in accordance with the invention.

The record portion of a magnetic tape digital data processing system in accordance with the present invention, as shown in FIGURE 5, includes an FM modulator 51 coupled to one input of a summing amplifier 52, the other input of which receives a stable frequency pilot signal from a frequency standard 53. The output of the summing amplifier is applied to a record amplifier 54 having two identical outputs respectively coupled to pluralities of channel I and channel II rotary record heads arranged on a drum in the manner previously described to redundantly record the signal on two sets of tracks. The modulator 51, summing amplifier 52, frequency standard 53, and record amplifier 54 are equivalent to the corresponding components of the arrangement of FIGURE 1. However, an analog to digital converter 56 is provided to convert an analog data input signal 57 to non-return-to-zero form for application to the FM modulator 51. The digital signal has a transfer rate determined by a clock signal applied to a clock input of the converter from a data clock 58. The data clock is coupled to the frequency standard 53 for the purpose of synchronization. The clock pulses are thus in synchronism with the pilot signal applied to the summing amplifier 52, and as a result the non-return-to-zero digital data output of the converter as modulated by the modulator and added to the pilot signal is in synchronism with the pilot signal. Hence, the signal redundantly recorded on the tape includes the FM non-return-to-zero digital data signal in synchronism with the pilot signal, and both signals are synchronous with the frequency standard 53. Consequently, in the reproduce mode, the frequency standard may be employed as the system clock, and since the frequency standard has no errors, the clock has no errors.

Figure 6:
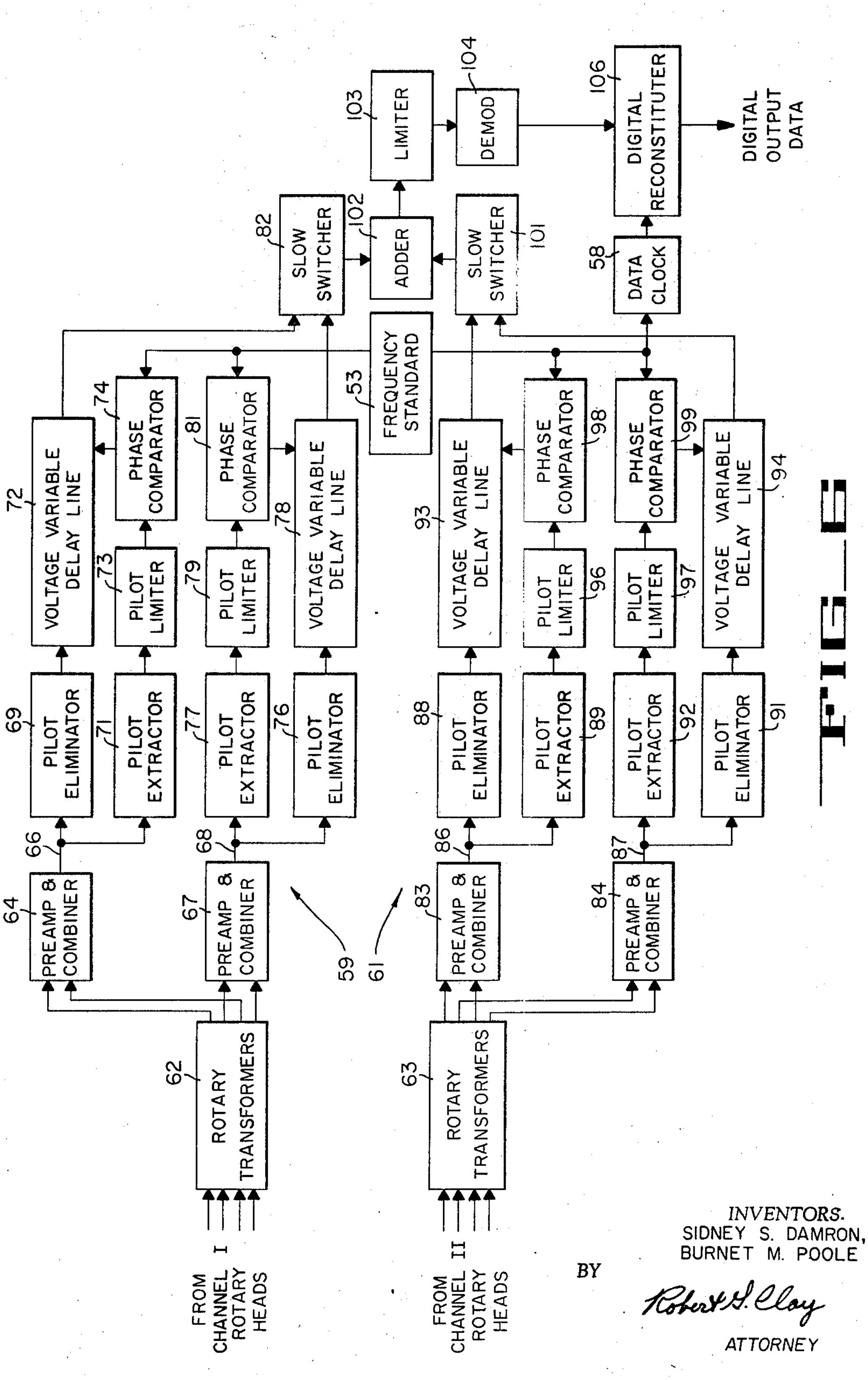
FIGURE 6 is a block diagram of the reproduce portion of the digital data processing system.

Referring now to FIGURE 6, the reproducing portion of the digital data processing system will be seen to include channel I head signal combining and time base correcting circuitry 59 and channel II head signal combining and time base correcting circuitry 61, respectively coupled, as by means of rotary transformers 62 and 63, to receive the signals sequentially reproduced by the channel I and channel II rotary heads. The heads reproduce the signal redundantly recorded on the two sets of tracks on the tape in the manner previously described. The circuitry 59 includes a preamplifier and combiner 64 which receives the signals from diametrically opposed channel I heads A and C and combines same such that they appear sequentially at a single output 66. Similarly, a preamplifier and combiner 67 receives the signals from diametrically opposed channel I heads B and D to combine same such that they appear sequentially at a single output 68.

The outputs 66 and 68 are coupled to time base correctors of a conventional type. More particularly, one corrector includes a pilot eliminator 69 and pilot extractor 71, which may be, for example, filters, commonly coupled to the output 66. The output of the pilot eliminator is coupled to a voltage variable delay line 72, while the output of the pilot extractor is coupled by a pilot limiter 73 to one input of a phase comparator 74. In this manner, the information and pilot signals are separated with the former being applied to the delay line and the latter being applied to the phase comparator. A second input of the phase comparator is coupled to the frequency standard 53, or equivalent means. The comparator develops an output error signal proportional to departures in the phase of the pilot signal, and therefore of the information signal, from that of the frequency standard: The error signal is thus representative of time base errors in the information signal. The error signal is applied to a control input of the delay line 72 to vary the delay thereof in compensatory relation to the time base errors. In this manner, the information signal transmitted through the delay line is time base corrected.

The other time base corrector similarly includes a pilot eliminator 76 and pilot extractor 77 commonly coupled to the output 68. The output of the pilot eliminator is coupled to a voltage variable delay line 78, while the output of the pilot extractor is coupled by a pilot limiter 79 to one input of a phase comparator 81. A second input of the phase comparator is coupled to the frequency standard 53, and the error signal output of the comparator is coupled to a control input of the delay line 78. The delay of the line is varied in accordance with the error signal, in a manner analogous to the delay line 72, to effect time base correction of the information signal received from the output 68. Thus, time base correction of the channel I signals reproduced by heads A and C is effected by the delay line 72, while the channel I signals reproduced by heads B and D are time base corrected by delay line 78. The time base corrected output signals from delay lines 72 and 78 are applied to a slow switcher 82 which combines the sequentially occuring signals from heads A, B, C, D into a continuous channel I signal.

The circuitry 61 for processing the channel II signal is identical to the channel I circuitry 59 just described. More particularly, there are provided a preamplifier and combiner 84 coupled to the rotary transformer 63 to respectively channel the signals from channel II heads E and G to a single output 86, and the signals from channel II heads F and H to a single output 87. The output 86 is commonly coupled to a pilot eliminator 88 and a pilot extractor 89, and the output 87 is commonly coupled to a pilot eliminator 91 and pilot extractor 92. Voltage variable delay lines 93 and 94 are respectively coupled to the pilot eliminators 88 and 91, and the pilot extractors 89 and 92 are coupled by means of pilot limiters 96 and 97 to phase comparators 98 and 99. The frequency standard 53 is coupled to the phase comparators 98 and 99 which thus develop error signals respectively representative of time base errors in the information signal reproduced by heads E and G, and reproduced by heads F and H. The outputs of the phase comparators 98 and 99 are respectively coupled to control inputs of the delay lines 93 and 94 to vary the delays thereof in compensatory relation to the time base errors in the signals transmitted therethrough. The channel II signals reproduced by heads E and G and by heads F and H appearing at the outputs of the delay lines are thus time base corrected. Such signals are applied to a slow switcher 101 which combines same into a continuous channel II signal. Since the signals in both channels are time base corrected with reference to the same frequency standard 53 the continuous channel I and channel II signals at the outputs of slow switchers 82 and 101 are substantially in phase.

The outputs of the slow switchers 82 and 101 are applied to an adder 102 which produces a summation signal of the type depicted as waveform *c* of FIGURE 4 wherein dropouts in either of the channel I or channel II signals are inconsequential. The summation signal is limited by a limiter 103 and applied to a demodulator 104. It will be appreciated that the reproduce circuit of FIGURE 6, as described to this point is fully equivalent to the circuit of FIGURE 2. However the present circuit has been described in greater detail. In addition, in the present circuit the demodulated output of demodulator 104 is applied to a digital reconstituter 106 which is clocked by the data clock 58, or equivalent means. As in the case of the record mode, the frequency standard 53 is coupled in synchronizing relation to the clock whereby the clock signal is synchronous with the frequency standard, and therefore with the reproduced data signal issuing from the demodulator 104. Error-free clocking is thus obtained and the original non-return-to-zero data is derived from the output of the reconstituter. Moreover, by virtue of the redundant recording and reproducing of the digital data signal, dropout errors are held to an extremely low rate. The overall error rate is thus also extremely low.

What is claimed is:

1. A low error rate wideband rotary head recording and reproducing system comprising a plurality of sets of circumferentially spaced rotary heads for sweeping across a magnetic tape, said heads of each of the respective sets being circumferentially spaced relative to those of the other sets so that heads of respective sets simultaneously sweep across the tape at spaced apart positions thereof, an FM modulator for receiving an input information signal and converting same to an FM signal, means coupled to said modulator for simultaneously applying said FM signal to said sets of heads to thereby effect redundant recording of the entire FM signal on a plurality of sets of tracks on said tape by the respective sets of heads, a plurality of reproduce channels respectively coupled to said sets of heads to receive FM signals reproduced by said sets of heads from said sets of tracks and render same substantially in phase, adder means coupled to said reproduce channels for adding the reproduced FM signals therefrom with negligible phase error therebetween to produce a summation FM signal, a limiter coupled to said adder means for limiting said summation FM signal, and demodulation means coupled to said limiter for producing a reproduced output information signal from the limited FM signal.

2. A low error rate wideband rotary head recording and reproducing system according to claim 1, further defined by a frequency standard for generating a stable frequency pilot signal, means coupled to said FM modulator and said frequency standard for adding said FM signal and pilot signal to produce a composite FM and pilot signal and simultaneously apply the composite signal to said sets of heads for redundant recording of the entire composite signal, and time base correction means included in each of said reproduce channels and coupled to said frequency standard for extracting the pilot signal portion from reproduced composite signals therein and comparing same to the frequency standard to develop an error signal for time base correcting the FM signal portion of the reproduced composite signal relative to said frequency standard, whereby the time base corrected FM signal portions in the respective reproduce channels are substantially in phase, said time base corrected FM signal portions being applied to said added means.

3. A low error rate wideband rotary head recording and reproducing system according to claim 2, further defined by an analog to digital converter coupled to said FM modulator for converting an analog input signal to a non-return-to-zero digital information signal at a transfer rate determined by a signal at a clock input of the converter, a data clock connected to said clock input of said converter and synchronously coupled to said frequency standard, a digital reconstituter coupled to said demodulation means for reconstituting digital data at a transfer rate determined by a signal at a clock input of the reconstituter, and means for coupling said data clock to said clock input of said reconstituter.

4. A low error rate wideband rotary head recording and reproducing system comprising an FM modulator for receiving an input information signal and generating an RF carrier having a frequency varied in accordance with the information signal, a frequency standard for generating a pilot signal having a stable frequency, summing means coupled to said modulator and frequency standard for generating a composite signal including the FM and pilot signals, a rotary head drum, a first set of four magnetic heads mounted on said drum at circumferential intervals of 90°, a second set of four magnetic heads mounted on said drum at circumferential intervals of 90°, said second set of heads being circumferentially spaced relative to said first set of heads, said drum sequentially sweeping said first and second sets of heads transversely of a longitudinally moving magnetic tape with heads of the respective sets simultaneously sweeping across spaced-apart portions of the tape, means commonly coupling the composite signal from said summing means to said first and second sets of heads whereby the entire composite signal is redundantly recorded on spaced-apart portions of the tape, first and second voltage variable delay line means for delaying the transmissions of signals between inputs and outputs thereof in accordance with signals at control terminals thereof, first and second phase comparator means for developing error signals at outputs thereof proportional to differences in phase between signals at first and second inputs thereof, means coupling said frequency standard to said second inputs of said first and second phase comparator means, means coupling pilot signal portions of signals sequentially reproduced by the heads of said first set of heads to said first input of said first phase comparator means, means coupling FM information signal portions of said signals sequentially reproduced by the heads of said first set of heads to said input of said first delay line means, means coupling said output of said first phase comparator means to said control terminal of said first delay line means to vary the delay thereof in compensatory relation to the error signal developed by said first phase comparator means, means coupling pilot signal portions of signals sequentially reproduced by the heads of said second set of heads to said first input of said second phase comparator means, means coupling FM information signal portions of said signals sequentially reproduced by the heads of said second sets of heads to said input of said second delay line means, means coupling said output of said second phase comparator means to said control terminal of said second delay line means to vary the delay thereof in compensatory relation to the error signal developed by said second phase comparator means, adder means coupled to the outputs of said first and second delay line means for adding the FM information signal portions therefrom to produce a summation FM information signal, a limiter coupled to said adder means for limiting said summation FM information signal, and demodulation means coupled to said limiter to produce an output information signal from the limited FM information signal.

5. A low error rate wideband rotary head recording and reproducing system according to claim 4, further defined by first, second, third, and fourth preamplifier and combiner means each having a pair of inputs and a single output, each preamplifier and combiner combining signals at said pair of inputs thereof into a single signal at said output thereof, means coupling one diametrically opposed pair of said heads of said first set thereof respectively to sad pair of inputs of said first preamplifier and combiner means, means coupling the other diametrically opposed pair of said heads of said first set thereof respectively to said pair of inputs of said second preamplifier and combiner means, means coupling one diametrically opposed pair of said heads of said second set thereof respectively to said pair of inputs of said third preamplifier and combiner means, and means coupling the other diametrically opposed pair of said heads of said second set thereof respectively to said pair of inputs of said fourth preamplifier and combiner means; said first delay line means including first and second voltage variable delay lines each having an input and output and a control terminal, said inputs of said first and second lines being coupled to receive FM information signal portions of signals at said outputs of said first and second preamplifier and combiner means; said second delay line means including third and fourth voltage variable delay lines each having an input and output and a control terminal, said inputs of said third and fourth lines being coupled to receive FM information signal portions of signals at said outputs of said third and fourth preamplifier and combiner means; said first phase comparator means including first and second phase comparators each having first and second inputs and an output, said first inputs of said first and second phase comparators being coupled to receive pilot signal portions of said signals at said outputs of said first and second preamplifier and combiner means, said second inputs of said first and second phase comparators being coupled to said frequency standard, said outputs of said first and second phase comparators being coupled to said control terminals of said first and second variable delay lines; said second phase comparator means including third and fourth phase comparators each having first and second inputs and an output, said first inputs of said third and fourth phase comparators being coupled to receive pilot signal portions of said signals at said outputs of said third and fourth preamplifier and combiner means, said second inputs of said third and fourth phase comparators being coupled to said frequency standard, said outputs of said third and fourth phase comparators being coupled to said control terminals of said third and fourth variable delay lines; and said adder means including first and second slow switchers each having a pair of inputs and an output, each of said slow switchers combining sequential signals at said pair of inputs thereof to form a continuous signal at said output thereof, said pair of inputs of said first slow switcher coupled to said outputs of said first and second variable delay lines, said pair of inputs of said second slow switcher coupled to said outputs of said third and fourth variable delay lines, and an adder having a pair of inputs and an output, said pair of inputs of said adder being coupled to said outputs of said first and second slow switchers, said output of said adder coupled to said limiter.

6. A low error rate wideband rotary head recording and reproducing system according to claim 5, further defined by a plurality of pilot signal eliminators respectively coupling said outputs of said first, second, third, and fourth preamplifier and combiner means to the inputs of said first, second, third, and fourth variable delay lines, and a plurality of pilot signal extractors respectively coupling said outputs of said first, second, third, and fourth preamplifier and combiner means to the first inputs of said first, second, third, and fourth phase comparators.

7. A low error rate wideband rotary head recording and reproducing system according to claim 4, further defined by an analog to digital converter coupled to said FM modulator for converting an analog input signal to a non-return-to-zero digital information signal at a transfer rate determined by a signal at a clock input of the converter, a data clock connected to said clock input of said converter and synchronously coupled to said frequency standard, a digital reconstituter coupled to said demodulation means for reconstituting digital data at a transfer rate determined by a signal at a clock input of the reconstituter, and means for coupling said data clock to said clock input of said reconstituter.

8. A low error rate wideband rotary head recording and reproducing system according to claim 6, further defined by an analog to digital converter coupled to said FM modulator for converting an analog input signal to a non-return-to-zero digital information signal at a transfer rate determined by a signal at a clock input of the converter, a data clock connected to said clock input of said converter and synchronously coupled to said frequency standard, a digital reconstituter coupled to said demodulation means for reconstituting digital data at a transfer rate determined by a signal at a clock input of the reconstituter, and means for coupling said data clock to said clock input of said reconstituter.

9. A low error rate wideband rotary head recording and reproducing system comprising a plurality of circumferentially spaced rotary heads for sweeping across a magnetic tape, said heads circumferentially spaced from each other so that at least two heads sweep across the tape simultaneously at spaced apart positions thereof, an FM modulator for receiving an input information signal and converting same to an FM signal, means coupled to said modulator for simultaneously applying said FM signal to said heads to thereby effect redundant recording of the entire FM signal on said tape, reproduce means coupled to said heads to receive FM signals reproduced by said heads from said tape and render same substantially in phase, and adder means coupled to said reproduce means for adding the reproduced FM signals therefrom to produce a summation FM signal.

10. A low error rate wideband rotary head recording and reproducing system according to claim 9 further defined by a limiter coupled to said adder means for limiting said summation FM signal, and demodulation means coupled to said limiter for producing a reproduced output information signal from the limited FM signal.

References Cited

UNITED STATES PATENTS

| | | | |
|---|---|---|---|
| 3,124,662 | 3/1964 | Ryder | 179—100.2 |
| 3,290,438 | 12/1966 | Okamura | 179—100.2 X |
| 3,304,377 | 2/1967 | Kietz et al. | 179—100.2 |

BERNARD KONICK, Primary Examiner

ROBERT S. TUPPER, Assistant Examiner

U.S. Cl. X.R.

178—6.6; 340—174.1